Figure 1:
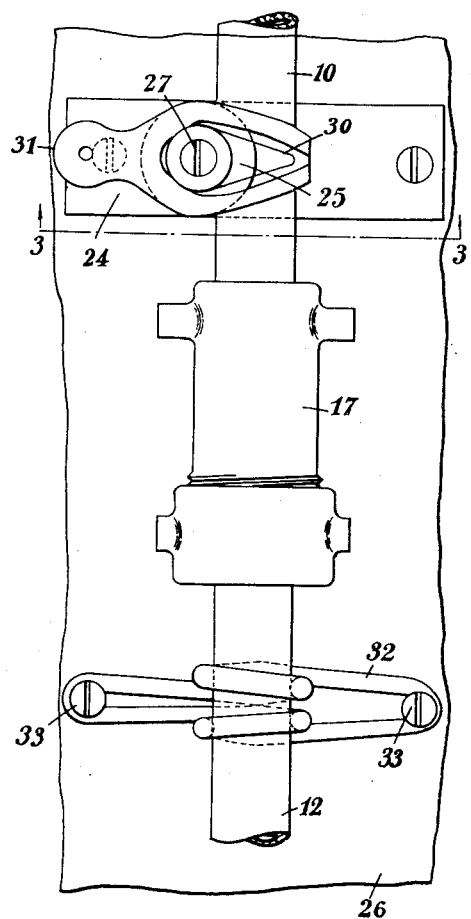

May 10, 1938.  F. J. T. BARNES  2,116,957

PIPE FIXING

Original Filed Feb. 15, 1935

Patented May 10, 1938

2,116,957

UNITED STATES PATENT OFFICE 2,116,957

PIPE FIXING

Frederick John Trevallon Barnes, Brisbane, Australia

Original application February 15, 1935, Serial No. 6,751. Divided and this application June 17, 1936, Serial No. 85,813. In Great Britain February 20, 1934

1 Claim. (Cl. 248—65)

The present invention relates to means for fixing pipes or tubes to supporting surfaces, such as walls, particularly glass or like pipes or tubes, such as are commonly used as pipe lines in breweries for the conveyance of beer and like beverages. Glass is particularly advantageous for the construction of pipe lines of this kind, which if made of metal are liable to attack and corrosion by the liquids which they convey. On the other hand glass pipes, owing to their fragile nature, are difficult to fix securely to walls or other supporting surfaces by ordinary mechanical fixing means made of metal.

Thus, one object of the invention is to provide simple and efficient fixing means for pipes which are not liable to result in damage to the pipes and a further object is to provide fixing means which can be easily and quickly unfixed to release the pipes when required, for replacement, cleaning and other purposes.

In accordance with the foregoing objects the improved pipe fixing means may, in one embodiment, comprise a recessed abutment, such as a reel, of resilient material, such as rubber, and a rubber or other resilient strap for holding a pipe in engagement with the abutment. In another embodiment the pipe fixing means may merely consist of a loop of rubber or the like which is passed round the tube and attached at its ends to fixed members on the supporting surface.

The present application is a division of my prior copending application Serial No. 6,751, filed February 15, 1935.

The various features of the invention will be apparent from the accompanying sheet of drawings which illustrate two embodiments of pipe fixing means according thereto. These specific embodiments of the invention are, however, only given by way of example and should therefore be taken in a purely illustrative sense.

In the drawing:—

Figure 2:
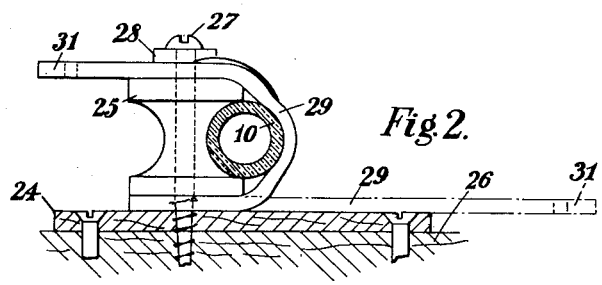

Fig. 1 shows a pair of coupled pipes secured to a wall or the like by two different forms of pipe fixing device according to the invention, and Fig. 2 is a cross sectional view on the line III—III of Fig. 1.

As shown in the drawing two pipes or tubes 10 and 12 made of glass, porcelain or metal are coupled together by a coupling 11 the construction of which forms no part of this invention.

Above the coupling 11 is fixed to the wall or other supporting surface 26 a base plate 24 carrying a reel-shaped abutment member 25 made of resilient material, as for example vulcanized rubber. The said reel 25 is secured in position by means of a long screw 27. The reel 25 is surmounted by a thick rubber washer 28 and between the reel and the base plate 24 is fastened one end of a rubber strap 29, the other end of which is divided, as shown, so as to be capable of opening to form a large eye 30 when engaged over the washer 28, and terminates in a tag portion 31.

With the strap in the position shown in dotted lines in Fig. 2, the glass tube 10 is brought into engagement with the groove of the reel 25. The strap is then stretched and pulled over the pipe and reel 25 until the eye 30 engages over the washer 28. On release of the tag 31 the rubber strap 29 remains hooked round the washer 28 and holds the pipe 12 fast in the groove of the reel 25.

An alternative form of fixing is shown in the lower part of Fig. 1 for holding the pipe 12 in position. This fixing simply consists of a loop of thick rubber cord 32 which encircles the tube 12 and after passing through itself is anchored by being stretched over two screws 23 driven into the supporting surface 26.

Pipe fixings of the above kind may be distributed along lengths of pipe at suitable intervals and may be used with either horizontal or vertical pipes.

It will be appreciated from the foregoing that the improved pipe fixings are particularly suitable for fixing pipes of fragile material together such as those made of glass porcelain or the like. Also they are of simple and cheap construction and may be quickly and easily operated to fix and release pipes.

I claim:—

Means for fixing pipes of fragile material such as glass to a support, comprising a grooved cylindrical abutment member, a fixing screw passing axially through said cylindrical member, and a flexible strap through one end of which the pointed end of said fixing screw passes, the other end of said strap being slotted for engagement over a projection at the other end of said member.

FREDERICK JOHN TREVALLON BARNES.